United States Patent [19]
Konicek et al.

[11] Patent Number: 5,585,682
[45] Date of Patent: Dec. 17, 1996

[54] THERMALLY COMPENSATED ASSEMBLY FOR A GENERATOR

[75] Inventors: Timothy S. Konicek; Tyrone A. Johnsen, both of Rockford, Ill.

[73] Assignee: Sundstrand Corporation, Rockford, Ill.

[21] Appl. No.: 149,878

[22] Filed: Nov. 10, 1993

[51] Int. Cl.$^6$ .................................................. H02K 5/00
[52] U.S. Cl. ............................ 310/89; 384/493; 384/557; 310/258
[58] Field of Search .............................. 310/89, 64, 346, 310/260, 258; 384/493, 557

[56] References Cited

U.S. PATENT DOCUMENTS

| | | | |
|---|---|---|---|
| 2,399,352 | 4/1946 | Jones | 171/252 |
| 2,867,460 | 1/1959 | Johnson | 287/52 |
| 3,237,035 | 2/1966 | Hoffmann | 310/217 |
| 4,227,109 | 10/1980 | Mulach | 310/258 |
| 4,250,423 | 2/1981 | Linscott, Jr. | 310/258 |
| 4,564,780 | 1/1986 | Nel | 310/258 |
| 4,573,867 | 3/1986 | Hand | 415/134 |
| 4,895,462 | 1/1990 | Takata | 384/493 |
| 5,028,152 | 7/1991 | Hill et al. | 384/557 |
| 5,051,642 | 9/1991 | Hediger et al. | 310/260 |
| 5,122,704 | 6/1992 | Blakeley et al. | 310/54 |
| 5,141,357 | 8/1992 | Sherman et al. | 403/408.1 |
| 5,218,252 | 6/1993 | Iseman et al. | 310/64 |

Primary Examiner—Steven L. Stephan
Assistant Examiner—Elvin Enad
Attorney, Agent, or Firm—Sundstrand Corporation

[57] ABSTRACT

A thermally compensated assembly for a generator for controlling the stress on a stator within a housing subject to temperature changes. The thermally compensated assembly includes a stator, a housing enclosing the stator, first and second thermal compensation members provided on each end of the stator and means for securing the first and second thermal compensation members with respect to the housing. The thermal compensation members are provided with angled portions disposed with respect to each other. The angle of the angled portions may be chosen equal or slightly different than a predetermined angle to provide a constant or variable axial load on said stator when said thermally compensated assembly is subject to changes in temperature.

33 Claims, 3 Drawing Sheets

THERMALLY COMPENSATED ASSEMBLY FOR A GENERATOR

TECHNICAL FIELD

The present invention relates to a thermally compensated assembly for a generator in which a stator is anchored in a stator housing by one or more thermally compensated members.

BACKGROUND ART

A generator may be used to convert mechanical power developed by a motor or an engine into electrical power. Such a generator has a housing, a stator provided within the housing, and a rotor magnetically coupled to the stator. When used in an aircraft, a generator converts mechanical power developed by an engine into electrical power used in the various systems of the aircraft.

The housing of a generator is typically composed of a relatively lightweight material, such as aluminum or magnesium alloy, while the stator typically comprises a plurality of relatively thin iron sheets laminated together with an adhesive, such as epoxy. The stator is provided with an initial axial load pressure, or axial preload, to force the sheets to remain in contact with each other. The stator is typically mounted within the housing by bolts which pass through holes in the stator housing and into the stator. One or more sets of bolts may be provided radially about the circumference of the stator housing, such as 120° apart.

When used in an aircraft, a generator has a relatively wide temperature range through which it is exposed, for example from −65° F. to +450° F. Because the ferrous material of the stator typically has a coefficient of radial thermal expansion that is substantially different than that of the stator housing, the stator and stator housing undergo substantially different rates of radial thermal expansion when subject to temperature changes, with the stator housing typically changing more than the stator. The relative radial growth of the stator housing with respect to the stator causes mechanical stress on the housing, and may result in cracks in the housing.

Since the coefficients of axial thermal expansion of the stator and housing are typically different, the stator housing expands relative to the stator in an axial direction along the length of the stator and exerts an axial spreading force that undesirably decreases the axial load pressure holding the stator laminations together and undesirably stresses the adhesive bond of the stator laminations. If the axial thermal growth differential and resultant stresses are sufficient, the epoxy bond holding the stator laminations together may fracture resulting in delamination of the stator at elevated temperatures or the housing stress may exceed its allowable limit resulting in housing cracks at low temperatures.

Although existing axial retaining devices may be used to maintain the integrity of the stator laminations at all temperatures, such devices make the generator more complex, attribute to a reduction in performance, and cause additional mechanical stress on the stator housing in the axial direction, since the rate of axial growth of the stator housing is then constrained by the rate of axial growth of the stator.

SUMMARY OF THE INVENTION

The present invention is directed to a thermally compensated assembly for a generator having a stator and a housing which regulates the overall stress on the housing in response to temperature fluctuations to reduce mechanical stress on the stator housing, avoid the formation of cracks in the housing, and reduce the likelihood of stator delamination.

In one aspect, the invention is directed to a thermally compensated assembly having a stator formed of a material having a first coefficient of axial thermal expansion $\alpha_1$. The assembly includes a first thermal compensation member, associated with one end of the stator, formed of a material having a second coefficient of axial thermal expansion $\alpha_2$ and having a length $l_2$ and a first angled portion disposed at an angle $\phi$.

The assembly includes a second thermal compensation member having a second angled portion disposed substantially at the angle $\phi$, being formed of a material having a third coefficient of thermal expansion $\alpha_3$, and having a length $l_3$. The first and second angled portions of the thermal compensation members are disposed adjacent each other so that they move with respect to each other in response to temperature changes.

The assembly further includes a housing enclosing the stator and the first and second thermal compensation members. The housing is formed of a material having a fourth coefficient of axial thermal expansion $\alpha_4$ which may be greater than the first coefficient of axial thermal expansion $\alpha_1$. The coefficient of radial thermal expansion of the housing may be substantially equal to the coefficient of radial thermal expansion of the second thermal compensation member.

The angle $\phi$ of the angled portions of the thermal compensation members is selected to be not substantially less than an angle $\theta$ substantially defined in accordance with the equation: $\tan\theta = [\alpha_4 l_4 - \alpha_1 l_2 - \alpha_3 l_3]/[r(\beta_2 - \beta_1)]$, where r is substantially equal to the distance from the middle of the central bore in the stator to a portion of one of the thermal compensation members, where $l_1$ is the length of the stator from the first thermal compensation member to a point of no relative axial movement between the stator and the housing, where $l_4$ is the length of a portion of the housing which terminates at a point of no relative axial movement between the stator and the housing, where $\beta_1$ is the coefficient of radial thermal expansion of either the stator or the first thermal compensation member, and where $\beta_2$ is the coefficient of radial thermal expansion of either the housing or the second thermal compensation member.

The angle $\phi$ of the angled portions of the thermal compensation members may be made substantially greater than the angle $\theta$ defined above so as to provide an axial load decrease on the housing when the thermally compensated assembly is subject to a decrease in temperature. As a result, the combined stress level of the housing is limited.

A pair of additional thermal compensation members may be provided with respect to a second end of the stator, and the thermally compensated assembly may further include a stop member at one end of the stator and a means for adjustably securing the other end of the stator to allow the stator to be provided with a defined axial preload.

The features and advantages of the invention will be apparent to those of ordinary skill in the art in view of the detailed description of the preferred embodiments, made with reference to the drawings, a brief description of which is provided below.

DESCRIPTION OF THE PREFERRED EMBODIMENTS

Figure 1A:
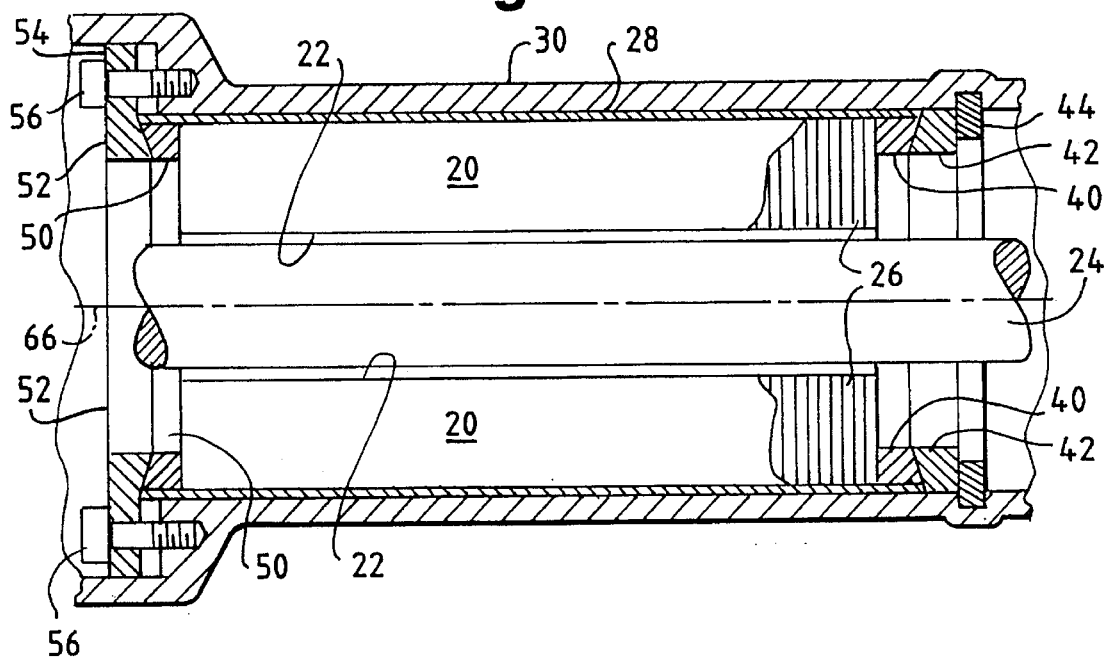
FIG. 1A illustrates a generator incorporating an embodiment of a thermally compensated assembly in accordance with the invention.

FIG. 1A illustrates one embodiment of a thermally compensated assembly for a generator 10 in accordance with the invention. The generator 10 includes a cylindrical stator 20 having a central bore 22 formed therein to accommodate a rotor 24 rotatable with respect to the stator 20. The stator 20, which is shown partly in cross-section at the right-hand portion of FIG. 1A, comprises a plurality of relatively thin iron sheets or disks 26 laminated together by a suitable adhesive material, such as epoxy, and additionally the stator 20 is radially contained by a relatively thin circumferential sleeve 28. The stator 20 is provided within a generally cylindrical housing 30 composed of a relatively lightweight metal such as aluminum or magnesium alloy.

A first thermal compensation member or tapered ring 40 is disposed adjacent one end of the stator 20. The tapered ring 40, which is generally annular in shape, has a first flat or vertical annular face which abuts the stator 20 and a second frustoconical or angled face opposite the first face disposed at an angle $\phi$ (see FIG. 2) with respect to the first vertical face. The angled face of the tapered ring 40 is disposed adjacent a respective angled face of a second thermal compensation member or tapered ring 42. The tapered ring 42 has a flat or vertical face opposite its angled face which abuts a stop member, for example, in the form of an annular disk 44 provided in a circumferential groove formed in the interior of the housing 30.

The other end of the stator 20, shown in the left-hand portion of FIG. 1A, is disposed adjacent a flat or vertical face of a thermal compensation member or tapered ring 50 having a generally annular shape. Opposite its flat vertical face, the tapered ring 50 has an angled face disposed at an angle $\phi$ which lies adjacent a similarly angled face of a thermal compensation member or tapered ring 52. The tapered ring 52 may have an annular collar section 54 of a larger diameter than the tapered ring 50, and a number of bolts 56 are disposed through a number of bores in the collar section 54 and into the housing 30 to axially secure the stator 20 within the housing 30.

The outer diameter of the sleeve 28 may be made slightly larger than the inner diameter of the housing 30 to provide an interference fit therebetween, resulting in a preload on the stator 20 and the sleeve 28 in the radial direction. A preload may also be provided on the stator 20 in the axial direction, such as by tightening the bolts 56 a predetermined amount.

The stator 20 has coefficients of both axial and radial thermal expansion that are typically less than the respective coefficients of thermal expansion of the housing 30. The coefficient of axial thermal expansion of the laminated stator 20 is also typically different than its coefficient of radial thermal expansion.

The coefficients of radial thermal expansion of the tapered rings 42, 52 are selected to be substantially equal to the coefficient of radial thermal expansion of the housing 30, and the outer diameters of the rings 42, 52 are sized to remain in contact with the applicable inner diameters of the housing 30. In a similar manner, the coefficients of radial thermal expansion of the tapered rings 40, 50 and the sleeve 28 are selected to be substantially equal to the coefficient of radial thermal expansion of the stator 20.

The structure of the generator 10 shown in the Figures is not shown to scale, and details of the generator 10, such as the stator coils and the mechanical structure of the rotor for example, have been omitted for purposes of clarity. Except for the thermal compensating assembly described in further detail below, the particular structure of the generator 10 is not considered important to the present invention.

Figure 1B:
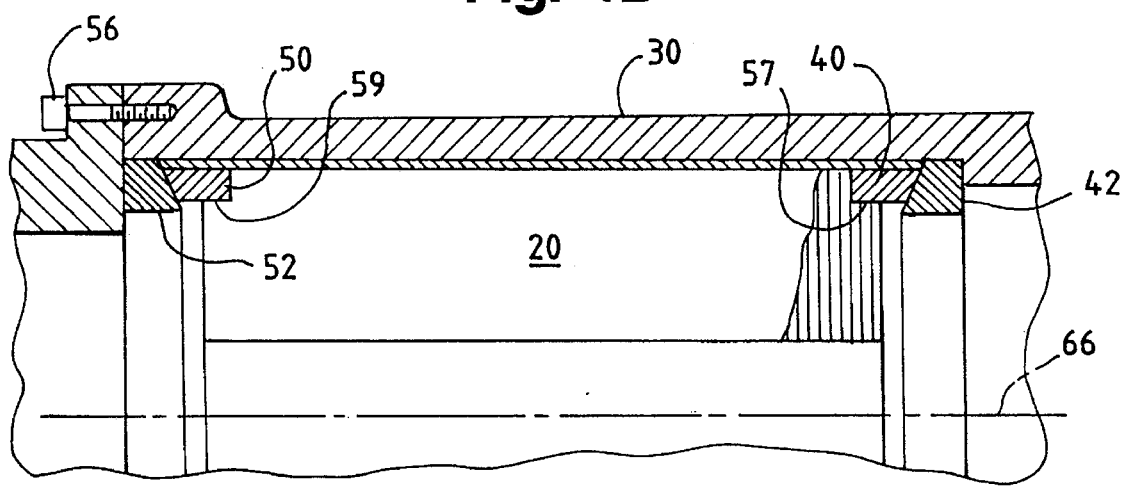
FIG. 1B illustrates a generator incorporating an alternative embodiment of a thermally compensated assembly in accordance with the invention.

FIG. 1B illustrates a thermally compensated assembly similar to that of FIG. 1A, except that the outer sleeve 28 is not present and its function to contain the stator 20 concentric with the tapered rings 40, 50 is accomplished by steps 57, 59 formed in each end of the stator 20. The outer diameters of the steps 57, 59 tightly mate with the inner diameters of the tapered rings 40, 50, respectively.

Figure 2:
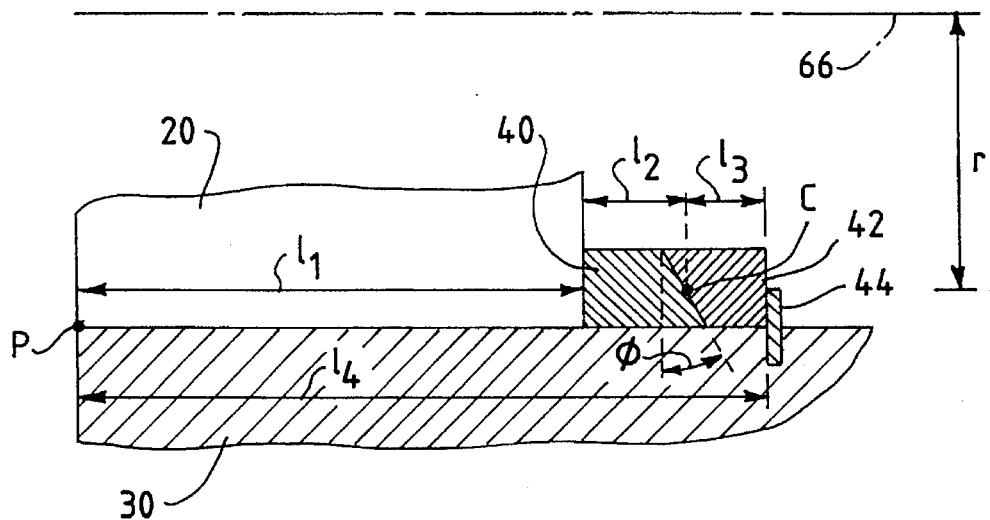
FIG. 2 illustrates a portion of the thermally compensated assembly.

Referring to FIG. 2, a portion of the generator 10 is shown as a thermally compensated assembly including the stator 20, the housing 30, the tapered ring 40 and the tapered ring 42. The stator 20 and the housing 30 are shown to terminate at a point P. The point P represents the point at which there is no relative axial movement between the stator 20 and the housing 30 when the thermally compensated assembly is subject to a temperature change. If two sets of tapered rings 40, 42, 50, 52 are used, and if the characteristics (size, angle $\phi$, and coefficient of thermal expansion) of the rings 40, 42 are identical to those of the rings 50, 52, then the point P will coincide with the midpoint of the stator 20. If two sets of tapered rings 40, 42, 50, 52 having non-identical characteristics are used, the point P of no relative movement will not coincide with the midpoint of the stator 20, but will coincide with some other point, such as one-third of the distance from one end of the stator 20. If only one set of tapered rings is used, the point P will coincide with the end of the stator 20 opposite the single set of tapered rings.

In order to provide thermal compensation to account for the different expansion rates of the elements 20, 30, 40, 42, 50, 52, the coefficients of thermal expansion of those elements, certain dimensions of those elements, and the angles $\phi$ of the tapered portions of the rings 40, 42, 50, 52 may be specially chosen as described in more detail below, which description is made with respect to one end of the stator 20.

Figure 3A:
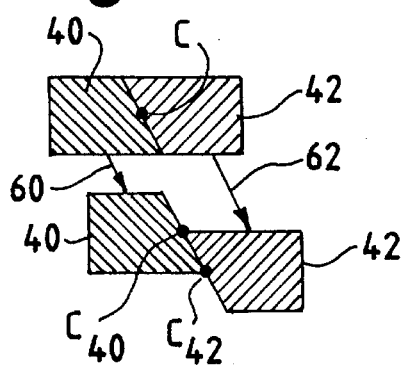
FIGS. 3A–3C illustrate the relative movement of the compensation components of the thermally compensated assembly of FIG. 2 due to temperature change.

Referring to FIG. 3A, the tapered rings 40, 42 provided at one end of the stator 20 are shown in the upper portion of FIG. 3A to be in an initial position at an initial temperature. In the initial position, the rings 40, 42 have a common point designated C, such as the mean radius of the thermal compensating rings 40, 42. In response to a temperature change, each of the rings 40, 42 expands (assuming that the temperature increases, that the thermal expansion coefficients of the rings 40, 42 are positive, and that the coefficient of thermal expansion of ring 42 is greater than that of ring 40) from its initial position to a subsequent position, shown at the lower portion of FIG. 3A, as indicated by arrows 60, 62, respectively. The amount of positional change in proportion to the size of the rings 40, 42 has been exaggerated in FIG. 3A to facilitate explanation. In their subsequent positions, the common point of the ring 40 has moved to a new point $C_{40}$ and the common point of the ring 42 has moved to a new point $C_{42}$.

Figure 3B:
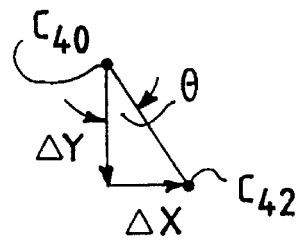

The positional difference between the point $C_{40}$ and the point $C_{42}$ is illustrated in FIG. 3B to include a horizontal (axial) positional difference $\Delta x$ and a vertical (radial) positional difference $\Delta y$. If the model is simplified by ignoring any deformations in the materials due to stresses induced by axial or radial loading, the following statements can be made.

To maintain the stator preload in the axial direction constant regardless of temperature, the angled portions of the tapered rings 40, 42 should be provided at an angle $\theta$ defined with respect to the amounts by which the tapered rings 40, 42 expand in the x and y directions as set forth in the following equation:

$$\tan \theta = \Delta x / \Delta y \quad [1]$$

Figure 3C:
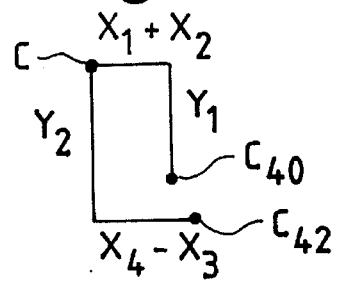

Referring to FIGS. 2 and 3C, the horizontal positional difference $\Delta x$ has four horizontal components $x_1, x_2, x_3, x_4$, which are due to the horizontal component of the expansion of the stator 20, the tapered ring 40, the tapered ring 42, and the housing 30, respectively. Referring to FIGS. 3B and 3C, the horizontal position difference $\Delta x$ is related to the four components in the following manner:

$$\Delta x = x_4 - x_3 - (x_1 + x_2) \quad [2]$$

$$\Delta x = x_4 - x_1 - x_2 - x_3 \quad [3]$$

Referring to FIG. 2, the magnitudes of the horizontal components $x_1, x_2, x_3, x_4$ are defined by the four equations set forth below:

$$x_1 = \alpha_1 \Delta T\, l_1 \quad [4]$$

$$x_2 = \alpha_2 \Delta T\, l_2 \quad [5]$$

$$x_3 = \alpha_3 \Delta T\, l_3 \quad [6]$$

$$x_4 = \alpha_4 \Delta T\, l_4 \quad [7]$$

In the above equations, $\alpha_1$ is the coefficient of axial thermal expansion of the stator 20, $\alpha_2$ is the coefficient of axial thermal expansion of the tapered ring 40, $\alpha_3$ is the coefficient of axial thermal expansion of the tapered ring 42, $\alpha_4$ is the coefficient of axial thermal expansion of the housing 30, $\Delta T$ is the temperature difference causing the change from the initial position of FIG. 3A to the subsequent position, $l_1$ is the length of the stator 20 from the tapered ring 40 to the point P of no relative axial movement between the stator 20 and the housing 30 (FIG. 2), $l_2$ is the length of the tapered ring 40 (FIG. 2), $l_3$ is the length of the tapered ring 42, and $l_4$ is the length of a portion of the housing 30 from the point of the housing 30 at which the tapered ring 42 is provided to the point P of no relative movement between the stator 20 and the housing 30 (FIG. 2).

From equations [3]–[7] above, $\Delta x$ can be expressed as follows:

$$\Delta x = \alpha_4 \Delta T\, l_4 - \alpha_1 \Delta T\, l_1 - \alpha_2 \Delta T\, l_2 - \alpha_3 \Delta T\, l_3 \quad [8]$$

$$\Delta x = \Delta T\, [\alpha_4 l_4 - \alpha_1 l_1 - \alpha_2 l_2 - \alpha_3 l_3] \quad [9]$$

Referring to FIGS. 2 and 3C, the vertical positional difference $\Delta y$ has two vertical components $y_1, y_2$. Referring to FIGS. 3B and 3C, the vertical position difference $\Delta y$ is related to the two components in the following manner:

$$\Delta y = y_2 - y_1 \quad [10]$$

Referring to FIG. 2, the magnitudes of the vertical components $y_1, y_2$ are defined by the following equations:

$$y_1 = \beta_1 \Delta T\, r \quad [11]$$

$$y_1 = \beta_2 \Delta T\, r \quad [12]$$

In the above equations, r is the radius of the tapered rings 40, 42, or the distance from the center of the rotor 24 represented in FIG. 2 by line 66 to the common point C, and $\Delta T$ is the temperature difference causing the change from the initial position of FIG. 3A to the subsequent position.

Depending on the configuration of the thermal compensation assembly, the values of $\beta_1$ and $\beta_2$ may represent: 1) the coefficients of radial thermal expansion of the rings 40, 42, respectively; 2) the coefficients of radial thermal expansion of the stator 20 and housing 30, respectively; 3) the coefficients of radial thermal expansion of the stator 20 and the ring 42, respectively; or 4) the coefficients of radial thermal expansion of the ring 40 and housing 30, respectively.

The coefficients of case 1) would apply where the tapered rings are provided as annular rings of unitary construction as described above.

Figure 4A:
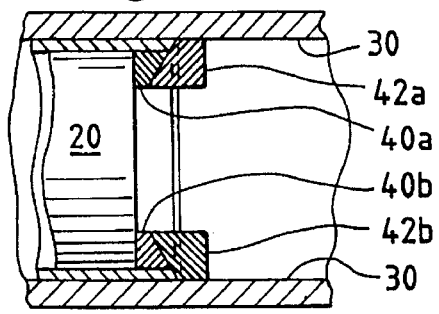
FIGS. 4A–4C illustrate a number of alternative embodiments of a thermally compensated assembly in accordance with the invention.

The coefficients of case 2) would apply where the rings 40, 42 were each provided, as shown in FIG. 4A for example, as two separate portions 40a, 40b, 42a, 42b spaced radially apart 180°, with the two portions 40a, 40b of rings 40 being fixed to the stator 20 and the curved portions 42a, 42b of rings 42 being fixed to the housing 30.

Figure 4B:
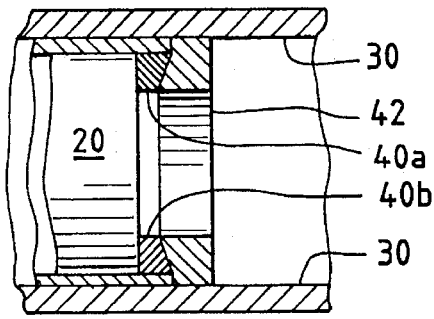

The coefficients of case 3) would apply where the ring 40 was provided, as shown in FIG. 4B for example, as two separate portions 40a, 40b spaced radially apart 180° fixed to the stator 20 and the ring 42 being annular and of unitary construction.

Figure 4C:
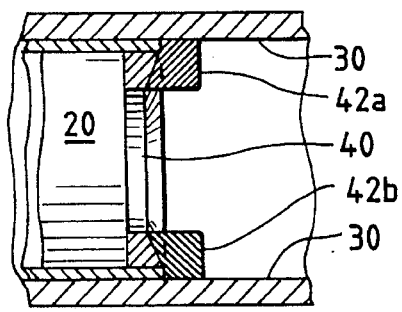

The coefficients of case 4) would apply where the ring 42 was provided, as shown in FIG. 4C for example, as two separate portions 42a, 42b spaced radially apart 180° fixed to the housing 30 and the ring 40 being annular and of unitary construction.

From equations [10]–[12] above, $\Delta y$ can be expressed as follows:

$$\Delta y = \beta_2 \Delta T\, r - \beta_1 \Delta T\, r \quad [13]$$

$$\Delta y = \Delta T\, r\, (\beta_2 - \beta_1) \quad [14]$$

From equations [1], [9], and [14] above, the relationship of the components of the temperature compensated assembly may be as follows:

$$\tan \theta = \Delta T\, [\alpha_4 l_4 - \alpha_1 l_1 - \alpha_2 l_2 - \alpha_3 l_3]/\Delta T\, r(\beta_2 - \beta_1) \quad [15]$$

$$\tan \theta = [\alpha_4 l_4 - \alpha_1 l_1 - \alpha_2 l_2 - \alpha_3 l_3]/[r(\beta_2 - \beta_1)] \quad [16]$$

In the temperature compensated assembly described above, the tapered ring 42 may be composed of a material having the same coefficient of axial thermal expansion as the housing 30, in which case $\alpha_3$ would equal $\alpha_4$. Also, as shown in FIG. 2, the lengths of the four elements 20, 30, 40, 42 are related by the following equation:

$$l_4 = l_1 + l_2 + l_3 \quad [17]$$

By substituting $\alpha_3$ for $\alpha_4$ and substituting $(l_1+l_2+l_3)$ for $l_4$ per equation [17] above, equation [16] above can be simplified as follows:

$$\tan \theta = [\alpha_3(l_1+l_2+l_3) - \alpha_1 l_1 - \alpha_2 l_2 - \alpha_3 l_3]\,/\,[r(\beta_2 - \beta_1)] \quad [18]$$

$$\tan \theta = [l_1(\alpha_3 - \alpha_1) + l_2(\alpha_3 - \alpha_2)]/[r(\beta_2 - \beta_1)] \quad [19]$$

Equations [16] and [19] set forth above define the relationship among the components of the thermally compensated assembly which will maintain an initial axial preload constant over a temperature range. However, it may be desirable to change the axial loading of the stator 20 from the initial amount by a predetermined amount when the generator is subject to a temperature change.

To increase the axial loading of the stator 20 for the thermally compensated assembly of FIG. 2, assuming that the housing 30 expands more than the stator 20 when both are subject to an increase in temperature, the angle ø at which the angled portions of the tapered rings 40, 42 are disposed would be selected to be larger than the angle θ defined by the above equations. As a result, the angled portions shown in FIG. 2 would become less vertical than they would be if the angle was selected to be equal to θ. Increasing the axial load on the stator laminations 26 would further reduce the likelihood of delamination.

In general terms, the overall stress rate of a structure is defined by the Von Mises relation which provides that the overall stress on a structure is proportional to the square root of the sum of the squares of the stresses in orthogonal directions. Thus, a decrease in stress in one direction on a structure may alleviate or reduce the overall stress on the structure where there is a simultaneous increase of stress in another direction on the structure.

In the embodiments illustrated in the Figures, where the coefficient of thermal expansion of the housing 30 is greater than that of the stator 20 and where ø is greater than θ, a decreased axial preload caused by a decrease in temperature would cause the housing 30 to be put in decreased tension in the axial direction. That decrease in mechanical stress in the axial direction would relieve the overall stress in the housing offsetting the increased mechanical stress in the radial or hoop direction caused by the decrease in the housing diameter being greater than the decrease in stator diameter.

The angle ø at which the angled portions of the tapered rings 50, 52 are disposed may be selected in accordance with the above description made in connection with the tapered rings 40, 42.

Figure 5:
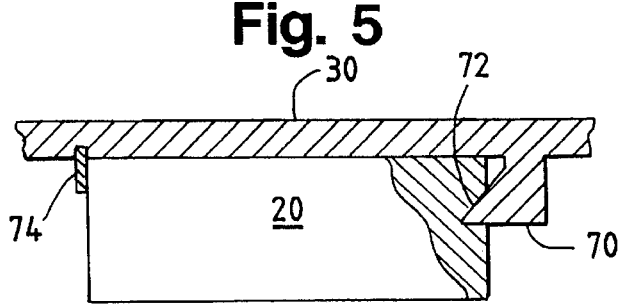
FIG. 5 illustrates another alternative embodiment of a thermally compensated assembly.

FIG. 5 illustrates schematically an alternative embodiment of the thermally compensated assembly in which a thermal compensation member 70 is formed integrally with the housing 30. The compensation member 70 has an angled portion 72 which is disposed within an annular recess in the stator 20. A stop member 74 is provided to secure the stator 20 within the housing 30. In FIG. 5, only the upper portion of the stator 20 is shown.

Figure 6:
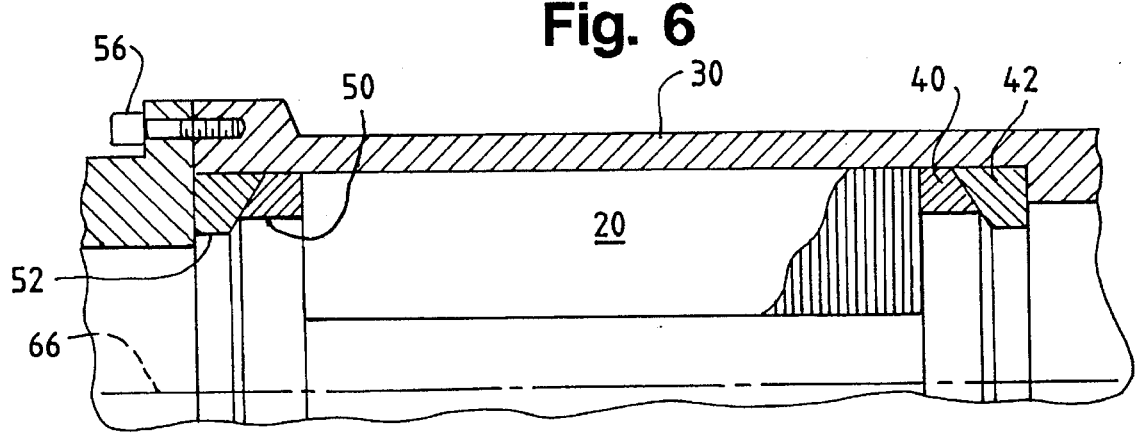
FIG. 6 illustrates an alternative embodiment of an axially thermally compensated assembly.

FIG. 6 is a schematic illustration of a further embodiment of the invention. The embodiment of FIG. 6 is similar to that of FIG. 1B, except that in FIG. 6 the angled portions of the rings 40, 42, 50, 52 slant the opposite way and the rings 40 and 50 are not rigidly connected to the stator 20. Because there is no rigid connection between the rings 40, 50 and the stator 20, the embodiment of FIG. 6 regulates the stress on the housing 30 only in the axial direction, not the radial direction. The embodiment of FIG. 6 could be combined with other structures for controlling the housing stress in the radial direction, such as the structure disclosed in U.S. Pat. No. 5,218,252, the disclosure of which is incorporated herein by reference.

Numerous modifications could be made to the embodiments of the thermally compensated assembly described above. For example, where two sets of thermal compensation members are utilized, one at each end of the stator, the angled portions of one set could be provided with an angle different than the angled portions of the other set to provide the desired overall thermal compensation.

Additional modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A thermally compensated assembly for a generator for regulating the stress on a housing enclosing a stator in response to temperature fluctuations, said thermally compensated assembly comprising:

a stator formed of a material having a first coefficient of axial thermal expansion $\alpha_1$, said stator having a first stator end, a second stator end, and a central bore therethrough to accommodate a rotor;

a first thermal compensation member associated with said first end of said stator, said first thermal compensation member formed of a material having a second coefficient of axial thermal expansion $\alpha_2$, said first thermal compensation member having a length $l_2$ and a first angled portion disposed at an angle ø;

a second thermal compensation member having a second angled portion disposed substantially at said angle ø, said first and second angled portions being disposed adjacent each other, said second thermal compensation member being formed of a material having a third coefficient of axial thermal expansion $\alpha_3$ and a length $l_3$;

a third thermal compensation member associated with said second end of said stator, said third compensation member having a third angled portion;

a fourth thermal compensation member provided adjacent said third thermal compensation member, said fourth thermal compensation member having a fourth angled portion, said third and fourth angled portions being disposed adjacent each other; and a housing enclosing said stator and said thermal compensation members, said housing being formed of a material having a fourth coefficient of axial thermal expansion $\alpha_4$, wherein said angle ø of said angled portions of said first and second thermal compensation members is substantially greater than an angle θ defined by the following equation so as to provide a decreased axial load on said stator when said thermally compensated assembly is subject to a decrease in temperature:

$$\tan \theta = [\alpha_4 l_4 - \alpha_1 l_2 - \alpha_3 l_3]/[r(\beta_2 - \beta_1)],$$

wherein r is substantially equal to the distance from the middle of said central bore in said stator to a portion of one of said thermal compensation members;

wherein $l_1$ is the length of said stator from said first thermal compensation member to a point of no relative axial movement between said stator and said housing;

wherein $l_4$ is the length of said housing from the point of said housing at which said second thermal compensation member is provided to the point of no relative axial movement between said stator and said housing;

wherein $\beta_1$ is the coefficient of radial thermal expansion of a first component of the group of components comprising said stator and said first thermal compensation member;

wherein $\beta_2$ is the coefficient of radial thermal expansion of a second component of the group of components comprising said housing and said second thermal compensation member;

wherein said fourth coefficient of axial thermal expansion $\alpha_4$ is greater than said first coefficient of axial thermal expansion $\alpha_1$; and wherein said housing and said second thermal compensation member have coefficients of radial thermal expansion that are substantially equal.

2. A thermally compensated assembly as defined in claim 1 wherein said second thermal compensation member comprises a plurality of portions radially spaced about said housing.

3. A thermally compensated assembly as defined in claim 1 wherein said first thermal compensation member comprises an annular ring having an outside diameter substantially equal to the inside diameter of said housing.

4. A thermally compensated assembly as defined in claim 3 wherein said second thermal compensation member comprises an annular ring having an outside diameter substantially equal to the inside diameter of said housing.

5. A thermally compensated assembly as defined in claim 1 additionally comprising a stop member disposed in the interior of said housing, said stop member having a face which abuts said second thermal compensation member.

6. A thermally compensated assembly as defined in claim 1 additionally comprising means for adjustably securing said fourth thermal compensation member to said housing.

7. A thermally compensated assembly as defined in claim 6 wherein said securing means comprises a bolt which passes through said fourth thermal compensation member into a threaded bore in said housing.

8. A thermally compensated assembly for a generator for varying the stress on a housing enclosing a stator in response to temperature fluctuations, said thermally compensated assembly comprising:

a stator formed of a material having a first coefficient of axial thermal expansion $\alpha_1$, said stator having a first stator end, a second stator end, and a central bore therethrough to accommodate a rotor;

a first thermal compensation member associated with said stator, said first thermal compensation member formed of a material having a second coefficient of axial thermal expansion $\alpha_2$, said first thermal compensation member having a length $l_2$ and a first angled portion disposed at an angle $\phi$;

a second thermal compensation member having a second angled portion disposed substantially at said angle $\phi$, said first and second angled portions being disposed adjacent each other, said second thermal compensation member being formed of a material having a third coefficient of axial thermal expansion $\alpha_3$ and having a length $l_3$; and a housing enclosing said stator and said first and second thermal compensation members, said housing being formed of a material having a fourth coefficient of axial thermal expansion $\alpha_4$, wherein said angle $\phi$ is not substantially less than the angle $\theta$ substantially defined in accordance with the equation:

$$\tan \theta = [\alpha_4 l_4 - \alpha_1 l_1 - \alpha_2 l_2 - \alpha_3 l_3]/[r(\beta_2 - \beta_1)],$$

wherein r is substantially equal to the distance from the middle of said central bore in said stator to a portion of one of said thermal compensation members;

wherein $l_1$ is the length of said stator from said first thermal compensation member to a point of no relative axial movement between said stator and said housing;

wherein $l_4$ is the length of said housing from the point of said housing at which said second thermal compensation member is provided to the point of no relative axial movement between said stator and said housing;

wherein $\beta_1$ is the coefficient of radial thermal expansion of a first component of the group of components comprising said stator and said first thermal compensation member; and wherein $\beta_2$ is the coefficient of radial thermal expansion of a second component of the group of components comprising said housing and said second thermal compensation member.

9. A thermally compensated assembly as defined in claim 8 wherein said second thermal compensation member comprises a plurality of portions radially spaced about said housing.

10. A thermally compensated assembly as defined in claim 8 wherein said first thermal compensation member comprises an annular ring having an outside diameter substantially equal to the inside diameter of said housing.

11. A thermally compensated assembly as defined in claim 8 wherein said second thermal compensation member comprises an annular ring having an outside diameter substantially equal to the inside diameter of said housing.

12. A thermally compensated assembly as defined in claim 8 additionally comprising a stop member disposed in the interior of said housing, said stop member having a face which abuts said second thermal compensation member.

13. A thermally compensated assembly as defined in claim 12 wherein said stop member is annular.

14. A thermally compensated assembly as defined in claim 13 wherein said annular stop member is partially disposed within an annular groove in said housing.

15. A thermally compensated assembly as defined in claim 8 wherein said fourth coefficient of axial thermal expansion $\alpha_4$ is greater than said first coefficient of axial thermal expansion $\alpha_1$.

16. A thermally compensated assembly as defined in claim 8 wherein said housing and said second thermal compensation member have coefficients of radial thermal expansion that are substantially equal.

17. A thermally compensated assembly as defined in claim 8 wherein said angle $\phi$ of said angled portions of said first and second thermal compensation members is substantially greater than said angle $\theta$ so as to provide a predetermined axial load decrease on said stator when said thermally compensated assembly is subject to a decrease in temperature.

18. A thermally compensated assembly as defined in claim 8 wherein said angle $\phi$ of said angled portions of said first and second thermal compensation members is substantially equal to said angle $\theta$ so as to provide a relatively constant axial load regardless of temperature variation.

19. A thermally compensated assembly as defined in claim 8 additionally comprising:

a third thermal compensation member associated with said second end of said stator, said third compensation member having a third angled portion; and a fourth thermal compensation member provided adjacent said third thermal compensation member, said fourth thermal compensation member having a fourth angled portion, said third and fourth angled portions being disposed adjacent each other.

20. A thermally compensated assembly as defined in claim 19 additionally comprising means for adjustably securing said fourth thermal compensation member to said housing.

21. A thermally compensated assembly as defined in claim 20 wherein said securing means comprises a bolt which passes through said fourth thermal compensation member into a threaded bore in said housing.

22. A thermally compensated assembly as defined in claim 8 wherein said second thermal compensation member is integral with said housing.

23. A thermally compensated assembly for a generator for varying the stress on a housing enclosing a stator in response to temperature fluctuations, said thermally compensated assembly comprising:

a stator formed of a material having a first coefficient of axial thermal expansion $\alpha_1$, said stator having a first stator end, a second stator end, a length $l_1$, and a central bore therethrough to accommodate a rotor;

a first thermal compensation member associated with said stator, said first thermal compensation member formed of a material having a second coefficient of axial thermal expansion $\alpha_2$, said first thermal compensation member having a length $l_2$ and a first angled portion disposed at an angle ø;

a second thermal compensation member having a second angled portion disposed substantially at said angle ø, said first and second angled portions being disposed adjacent each other, said second thermal compensation member being formed of a material having a third coefficient of axial thermal expansion $\alpha_3$ and having a length $l_3$; and a housing enclosing said stator and said first and second thermal compensation members, said housing being formed of a material having a fourth coefficient of axial thermal expansion $\alpha_4$ and having a housing portion with a length $l_4$, wherein said angle ø is not substantially less than the angle θ substantially defined in accordance with the equation:

$$\tan\theta = [\alpha_4 l_4 - \alpha_1 l_1 - \alpha_2 l_2 - \alpha_3 l_3]/[r(\beta_2 - \beta_1)],$$

wherein r is substantially equal to the distance from the middle of said central bore in said stator to a portion of one of said thermal compensation members;

wherein $\beta_1$ is the coefficient of radial thermal expansion of a first component of the group of components comprising said stator and said first thermal compensation member; and wherein $\beta_2$ is the coefficient of radial thermal expansion of a second component of the group of components comprising said housing and said second thermal compensation member.

24. A thermally compensated assembly as defined in claim 23 wherein said first thermal compensation member comprises an annular ring having an outside diameter substantially equal to the inside diameter of said housing.

25. A thermally compensated assembly as defined in claim 23 additionally comprising a stop member disposed in the interior of said housing, said stop member having a face which abuts said second thermal compensation member.

26. A thermally compensated assembly as defined in claim 23 wherein said fourth coefficient of axial thermal expansion $\alpha_4$ is greater than said first coefficient of axial thermal expansion $\alpha_1$.

27. A thermally compensated assembly as defined in claim 23 wherein said housing and said second thermal compensation member have coefficients of radial thermal expansion that are substantially equal.

28. A thermally compensated assembly as defined in claim 23 wherein said angle ø of said angled portions of said first and second thermal compensation members is substantially greater than said angle θ so as to provide an increased axial load on said stator when said thermally compensated assembly is subject to an increase in temperature.

29. A thermally compensated assembly as defined in claim 23 wherein said angle ø of said angled portions of said first and second thermal compensation members is substantially equal to said angle θ so as to provide a relatively constant axial load on said stator regardless of temperature variations.

30. A thermally compensated assembly for a generator having a stator provided within a housing, said thermally compensated assembly comprising:

a stator formed of a material having a first coefficient of axial thermal expansion $\alpha_1$, said stator having a first end and a second end;

a first thermal compensation member associated with said first end of said stator, said first thermal compensation member having a first angled portion disposed at a first angle;

a second thermal compensation member having a second angled portion disposed substantially at an angle substantially equal to said first angle, said first and second angled portions being disposed adjacent each other, said second thermal compensation member having a second coefficient of axial thermal expansion $\alpha_2$;

a third thermal compensation member associated with said second end of said stator, said third compensation member having a third angled portion disposed at a second angle;

a fourth thermal compensation member provided adjacent said third thermal compensation member, said fourth thermal compensation member having a fourth angled portion disposed at an angle substantially equal to said second angle, said third and fourth angled portions being disposed adjacent each other; and a housing enclosing said stator and said thermal compensation members, said housing being formed of a material having a third coefficient of axial thermal expansion $\alpha_3$, wherein said first and second angles of said angled portions are selected to provide a decreased axial load on said stator when said temperature compensated assembly is subject to a decrease in temperature, wherein said first coefficient of axial thermal expansion $\alpha_1$ is substantially less than said third coefficient of axial thermal expansion $\alpha_3$, and wherein said housing and said second thermal compensation member have coefficients of radial thermal expansion that are substantially equal.

31. A thermally compensated assembly as defined in claim 30 wherein said first, second, third, and fourth thermal compensation members comprise annular rings having an outer diameter approximately equal to the inner diameter of said housing.

32. A thermally compensated assembly as defined in claim 30 wherein said first and second thermal compensation members are provided in a first step formed in said stator and wherein said third and fourth thermal compensation members are provided in a second step formed in said stator.

33. A thermally compensated assembly as defined in claim 30 wherein said first and second thermal compensation members are movable with respect to said stator.

* * * * *